(12) United States Patent
Watanabe

(10) Patent No.: US 9,732,933 B2
(45) Date of Patent: Aug. 15, 2017

(54) ILLUMINATION DEVICE

(71) Applicant: MINEBEA CO., LTD., Kitasaku-gun, Nagano (JP)

(72) Inventor: Takefumi Watanabe, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 105 days.

(21) Appl. No.: 14/847,322

(22) Filed: Sep. 8, 2015

(65) Prior Publication Data

US 2016/0076740 A1    Mar. 17, 2016

(30) Foreign Application Priority Data

Sep. 11, 2014 (JP) ................................ 2014-185251

(51) Int. Cl.
| | |
|---|---|
| F21V 5/02 | (2006.01) |
| G02B 19/00 | (2006.01) |
| F21V 7/00 | (2006.01) |
| G02B 5/04 | (2006.01) |

(52) U.S. Cl.
CPC ............ *F21V 5/02* (2013.01); *G02B 19/0028* (2013.01); *G02B 19/0066* (2013.01); *F21V 7/0091* (2013.01); *G02B 5/045* (2013.01)

(58) Field of Classification Search
CPC . F21V 5/02; F21V 7/0091; F21V 5/00; F21V 5/005; F21V 13/00; F21V 13/04; G02B 19/0028; G02B 19/0066; G02B 5/045; G02B 5/04
See application file for complete search history.

(56) References Cited

U.S. PATENT DOCUMENTS

| | | | | | |
|---|---|---|---|---|---|
| 3,988,609 | A | * | 10/1976 | Lewin ....................... | F21V 5/02 362/296.1 |
| 6,467,931 | B2 | * | 10/2002 | Tenmyo .................... | F21V 5/02 362/16 |
| 7,470,047 | B2 | * | 12/2008 | Lin ........................... | F21V 5/02 362/329 |
| 8,529,077 | B2 | * | 9/2013 | Suzuki ..................... | G02B 3/08 362/614 |

(Continued)

FOREIGN PATENT DOCUMENTS

| | | |
|---|---|---|
| JP | 2011171086 A | 9/2011 |
| JP | 3187902 U | 12/2013 |
| JP | 2014-093233 A | 5/2014 |

OTHER PUBLICATIONS

Office Action issued on Feb. 1, 2017 in the corresponding Japanese Patent Application No. 2014-185251.

*Primary Examiner* — Bao Q Truong
(74) *Attorney, Agent, or Firm* — Carrier Blackman & Associates, P.C.; Joseph P. Carrier; Jeffrey T. Gedeon

(57) ABSTRACT

An illumination device includes: a light source unit; and an optical member having a plate-like shape and disposed in front of the light source unit, wherein the optical member includes a first refractive prism having a function of refracting light, and a reflective prism disposed on an outer side of the first refractive prism and having a function of reflecting light, wherein an optical axis of the light source unit is configured to pass through a region in which the first refractive prism is disposed, wherein the first refractive prism is configured to cause an incident light to travel to a side opposite to the optical axis, and wherein the reflective prism is configured to cause an incident light to travel to the optical axis side.

19 Claims, 10 Drawing Sheets

(56) References Cited

U.S. PATENT DOCUMENTS

| | | | |
|---|---|---|---|
| 9,046,239 B2* | 6/2015 | Asai | F21V 5/02 |
| 9,267,666 B2* | 2/2016 | Takayama | F21V 13/04 |
| 9,476,565 B2* | 10/2016 | Sakai | F21V 5/045 |
| 9,494,300 B2* | 11/2016 | Takayama | F21V 13/04 |
| 2010/0246173 A1 | 9/2010 | Wei et al. | |

* cited by examiner

ILLUMINATION DEVICE

BACKGROUND

1. Field of the Invention

The present invention relates to an illumination device. In particular, the present invention relates to an illumination device for controlling the light distribution of light emitted from a light source by using an optical element.

2. Description of the Related Art

Generally, in an illumination device, various light distribution characteristics are required depending on installation environment in which the illumination device is installed. For example, for a street light (road light) of a type that is installed to stand beside a road, light distribution characteristics different from each other are often required in a road traffic direction and a road width direction orthogonal to the road traffic direction. Typically, in the road traffic direction, a so-called batwing light distribution is required for the purpose of uniformly illuminating a wide range. On the other hand, in the road width direction, an asymmetric light distribution for mainly illuminating the road side from the erected position of the street light is required.

The batwing light distribution refers to a bimodal light distribution pattern that has a peak in two angular directions opposite to each other from the lower side in the vertical direction of the illumination device. With this light distribution, a uniform horizontal illuminance distribution (e.g., illuminance distribution on the road surface) can be achieved over a wide range. In addition, a predetermined vertical illuminance distribution (e.g., illuminance distribution required for illuminating a pedestrian on walkways and crosswalks, from the viewpoints of safety, etc.) can be achieved.

Conventionally, in order to achieve such light distribution pattern, an illumination device for controlling the light distribution of light emitted from a light source by using an optical element has been suggested (e.g., see JP-A-2014-093233).

However, in the illumination device disclosed in JP-A-2014-093233, a bulky lens body is used as the optical element for controlling the light distribution of the illumination light. Therefore, it may be difficult to reduce the size and thickness of the optical element, eventually, the illumination device. Further, since an emitting surface of the lens body is configured by a plurality of complex three-dimensional curved surface, there may be a problem that the mass-productivity (productivity) is low. Further, the batwing light distribution described above is a light distribution characteristic that is not limited to the application of the street light but widely required in other illumination applications, such as a ceiling light for indoor illumination. Accordingly, an illumination device for achieving the batwing light distribution, which is small and can be easily mass-produced, is also in strong demand.

SUMMARY

One of objects of the present invention is to provide an illumination device that is capable of achieving the batwing light distribution by using a plate-like optical member that can be made thin and can be easily mass-produced.

Another one of objects of the present invention is to provide an illumination device that is suitable for a street light, which achieves the asymmetric light distribution for one direction and the batwing light distribution for a direction orthogonal to one direction by using a plate-like optical member that can be made thin and can be easily mass-produced.

According to an illustrative embodiment of the present invention, there is provided an illumination device including: a light source unit; and an optical member having a plate-like shape and disposed in front of the light source unit. The optical member includes a first refractive prism having a function of refracting light, and a reflective prism disposed on an outer side of the first refractive prism and having a function of reflecting light. An optical axis of the light source unit is configured to pass through a region in which the first refractive prism is disposed. The first refractive prism is configured to cause an incident light to travel to a side opposite to the optical axis The reflective prism is configured to cause an incident light to travel to the optical axis side.

According to another illustrative embodiment of the present invention, there is provided an illumination device that includes: a light source unit; and an optical member having a plate-like shape and disposed in front of the light source unit. The optical member comprises a first refractive prism having a function of refracting light, and a reflective prism disposed on an outer side of the first refractive prism and having a function of reflecting light. An optical axis of the light source unit is configured to pass through a region in which the first refractive prism is disposed The first refractive prism and the reflective prism are respectively configured so as to cause an incident light to travel to sides opposite to each other with respect to the optical axis.

According to still another illustrative embodiment of the present invention, there is provided an optical member having a plate-like shape and disposed in front of a light source unit, the optical member including: a first refractive prism having a function of refracting light; and a reflective prism disposed on an outer side of the first refractive prism and having a function of reflecting light. The first refractive prism is configured to cause an incident light incident to travel to a side opposite to an optical axis of the light source unit. The reflective prism is configured to cause an incident light to travel to an optical axis side.

BRIEF DESCRIPTION OF THE DRAWINGS

In the accompanying drawings:

FIGS. 1A and 1B are views showing a main portion of an illumination device according to a first embodiment of the present invention, wherein FIG. 1A is a side sectional view containing an optical axis of the illumination device, and wherein FIG. 1B is a plan view of an optical member included in the illumination device, as seen from an emitting surface;

FIGS. 9A and 9B are views showing an optical member in an illumination device according to a second embodiment of the present invention, wherein FIG. 9A is a plan view of the optical member as seen from an emitting surface side, and wherein FIG. 9B is a plan view of the optical member as seen from an incident surface side;

DETAILED DESCRIPTION

Figure 1A:
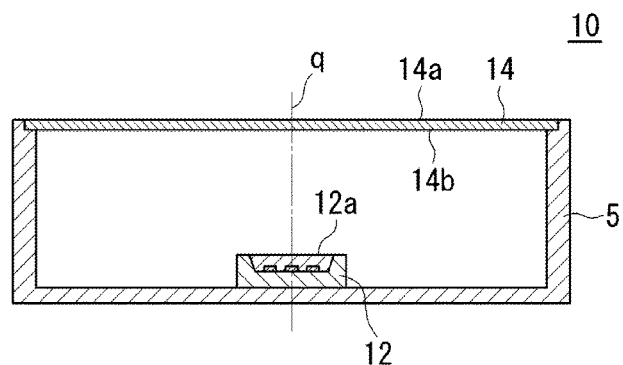

The following modes (1) to (8) described below illustrate the exemplary configurations of the present invention. In order to facilitate the understanding of various configurations of the present invention, each mode is described separately. Each mode is not intended to limit the technical scope of the present invention. Some of the components of each mode can be replaced and omitted, and other components can be added thereto, in consideration of the best mode for carrying out the invention. These can be also included in the technical scope of the present invention.

(1) There is provided an illumination device including: a light source unit; and an optical member having a plate-like shape and disposed in front of the light source unit. The optical member includes a first refractive prism having a function of refracting light, and a reflective prism disposed on an outer side of the first refractive prism and having a function of reflecting light. An optical axis of the light source unit is configured to pass through a region in which the first refractive prism is disposed. The first refractive prism is configured to cause an incident light to travel to a side opposite to the optical axis. The reflective prism is configured to cause an incident light to travel to the optical axis side.

In the present disclosure, the meaning of the phrases "the optical axis side" and "the side opposite to the optical axis" will be described. The meaning is as follows.

First, in connection with the light distribution control in the illumination device according to the present invention, a series of imaginary planes (hereinafter, referred to as a light distribution plane) that contain the optical axis (hereinafter, simply referred to as an optical axis) of the light source unit or are parallel to the optical axis are assumed to be set. Further, in the light distribution plane that does not contain the optical axis, an axis obtained by vertically projecting the optical axis on the light distribution plane is assumed to be set. Hereinafter, the optical axis contained in the light distribution plane and the axis obtained by vertically projecting the optical axis on the light distribution plane are collectively referred to as an "in-plane optical axis."

Further, in the present disclosure, paths of light after being refracted or reflected respectively by the first refractive prism or the reflective prism are vertically projected on the light distribution plane containing the incident positions of the light. When the projected paths once approach the in-plane optical axis, the light is considered to travel to "the optical axis side" (typically, the projected paths are displaced away from the in-plane optical axis after intersecting with the in-plane axis). Similarly, when the paths vertically projected on the light distribution plane are displaced away from the in-plane optical axis without intersecting with the in-plane optical axis, the light is considered to travel to "the side opposite to the optical axis."

Accordingly, in the present disclosure, the first refractive prism is configured to cause the light incident thereon to travel to the side opposite to the optical axis. This means that, for a series of light distribution planes which are set based on a suitable first method, the first refractive prism is configured to cause the light incident from any position thereof to be refracted and then to travel to the side opposite to the optical axis (in a meaning described above). Further, the reflective prism is configured to cause the light incident thereon to travel to the optical axis side. This means that, for a series of light distribution planes which are set based on the same method as the first refractive prism, the reflective prism is configured to cause the light incident from any position thereof to be reflected and then to travel to the optical axis side (in a meaning described above).

Further, in the present disclosure, an "outer side" refers to the side that is distant from the in-plane optical axis in each of the series of light distribution planes.

In the case where the first refractive prism and the reflective prism are provided on the emitting surface of the optical member, the travelling directions of the light incident to the first refractive prism and the reflective prism are directed to the side opposite to the optical axis and the optical axis side, respectively, by the first refractive prism and the reflective prism. That is, the travelling directions refer to a travelling direction of the light emitted from the emitting surface of the optical member. Further, in the case where the first refractive prism and the reflective prism are provided on the surface (typically, an incident surface of the light from the light source unit; hereinafter, also referred to as an incident surface) opposite to the emitting surface of the optical member, the paths of the light incident to the first refractive prism and the reflective prism are changed so that the incident light travels to the side opposite to the optical axis and the optical axis side, respectively. Then, generally, the incident light is emitted by being again refracted by the emitting surface of the optical member. Even in this case, the feature of the travelling direction of the emitted light, i.e., the feature that the emitted light travels to the side opposite to the optical axis and the optical axis side, respectively, is intended to be maintained.

Accordingly, in the mode (1), the first refractive prism having a function of refracting light is configured to cause the light incident thereon to travel to the side opposite to the optical axis. The reflective prism is configured to cause the light incident thereon to travel to the optical axis side. Therefore, even though the first refractive prism and the reflective prism are provided on any of the emitting surface and the incident surface of the optical member, first emitted light is directed to the side opposite to the optical axis and second emitted light is directed to the optical axis side. The first emitted light is emitted from the optical member through the first refractive prism and the second emitted light is emitted from the optical member through the reflective prism.

Generally, a suitable series of light distribution planes which are set for the illumination device are determined in accordance with the light distribution pattern required for the illumination device. Correspondingly, the refractive prism and the reflective prism, which are provided on the optical member, are configured.

For example, a light distribution pattern required for the illumination device may be achieved by a plurality of prisms. The plurality of prisms extend in a linear or curved form and is arranged in parallel with each other. In this case, each of the plurality of prisms is typically configured as follows. That is, at any position on a straight line or a curve along which the prisms extend, a tangent line at that position and one of the series of light distribution planes which are set in accordance with the light distribution pattern required are orthogonal to each other.

Specifically, for example, a light distribution pattern having some features along one direction may be required for the illumination device. In this case, light distribution planes that contain the optical axis and are parallel to the one direction are continuously selected parallel to each other along a direction orthogonal to the one direction, so that a series of light distribution planes are properly set. Correspondingly, a plurality of prisms is configured by arranging the linear prisms to be parallel to each other along the one direction. The linear prisms are respectively extended in a direction (accordingly, an arranging direction of a series of light distribution planes) orthogonal to the one direction. In this case, in any position of each prism, one of the series of light distribution planes which are set is orthogonal to a straight line (in this case, the same as a tangent line at that position) along which the prisms extend.

Further, for example, a light distribution pattern (or, a light distribution pattern directly reflecting the light distribution pattern of the light source unit) that is symmetrical about the optical axis may be required for the illumination device. In this case, the light distribution plane containing the optical axis is rotated with the optical axis being a rotation axis, so that a series of continuous light distribution planes are properly set. Accordingly, a plurality of prisms is configured by arranging prisms in parallel (in other words, concentrically) to each other along a radial direction. The prisms extend in a circumferential direction of a circle whose center is an intersection point between the optical axis and a prism forming surface of the optical member, respectively. In this case, each of the light distribution planes becomes a plane containing the diameter of the concentric circles and the optical axis. Therefore, in any position of each prism, one of the series of light distribution planes which are set is orthogonal to a tangent line of a circumferential curve along which the prisms extend, at that position.

In the illumination device described in the mode (1), an example of the setting method for the series of light distribution planes as described above and an example of the configuration of the prisms associated therewith are included. However, the present invention is not limited to these examples.

The illumination device described in the mode (1) is configured as described above. In particular, upon setting any suitable series of light distribution planes associated with the light distribution pattern required for the illumination device, the optical axis of the light source unit passes through the inside of a region in which the first refractive prism is disposed. Further, the first refractive prism is configured to cause the light incident thereon to travel to the side opposite to the optical axis. Further, the reflective prism is configured to cause the light incident thereon to travel to the optical axis side. Accordingly, specific operational advantages as described below can be achieved.

In the illumination device described in the mode (1), the incident position of light to the first refractive prism or the reflective prism and the emitting position of the incident light when being emitted from the optical member may be substantially different from each other, as seen in a plan view of the optical member. In this case, the light distribution plane described above may be set based on the emitting position (specifically, as a plane having the emitting position and containing the optical axis or being parallel to the optical axis).

In the present disclosure, the light distribution plane associated with the light incident on the first refractive prism or the reflective prism from each incident position is set as the light distribution plane containing the incident positions. However, this term is assumed to include the light distribution plane containing the emitting position of the incident light when being emitted from the optical member, as necessary.

In the illumination device described in the mode (1), the optical axis passes through the inside of a region (hereinafter, also referred to as a first refractive prism portion) in which the first refractive prism is disposed. Therefore, in the light distribution plane containing at least the optical axis, the first refractive prism is present at both one side and the other side, which are divided by an intersection point between the optical axis and the first refractive prism portion. Light is emitted (as first emitted light) by being refracted by the first refractive prism present in the one side. Light is emitted (as second emitted light) by being refracted by the first refractive prism present in the other side. The first refractive prism is configured to cause the light incident thereon to travel to the side opposite to the optical axis. Therefore, the first emitted light and the second emitted light are directed in an angular direction in which paths vertically projected in the light distribution plane are spread to the sides (i.e., to the outside, respectively) opposite to each other with respect to the optical axis.

The light distribution planes are set in such a way that a light distribution plane containing no optical axis is present. Even in the light distribution plane containing no optical axis, the first refractive prism may be present at both one side and the other side, which are divided by an intersection point between the in-plane optical axis and the first refractive prism portion. In this case, light is emitted (as first emitted light) by being refracted by the first refractive prism present in the one side. Light is emitted (as second emitted light) by being refracted by the first refractive prism present in the other side. The first emitted light and the second emitted light are emitted in an angular direction in which the emitted direction vertically projected in the light distribution plane is spread in directions opposite to each other with respect to the in-plane optical axis.

Furthermore, in the illumination device described in the mode (1), the reflective prism having a function of reflecting light is disposed on the outside of the first refractive prism. The reflective prism is configured to cause the light incident thereon to travel to the optical axis side. Therefore, for a specific light distribution plane, the light that travels in a direction having an angle with respect to the in-plane optical axis is added to the light distribution pattern by the light thus emitted.

Accordingly, in the illumination device described in the mode (1), the first refractive prism and the reflective prism have a light distribution function of emitting the light incident thereon in a direction having an angle with respect to the optical axis. Further, in at least the light distribution plane containing the optical axis, the angle includes angles in two directions opposite to each other with respect to the in-plane optical axis. Therefore, by suitably combining these light distribution functions, it is possible to achieve a desired batwing light distribution by using a plate-like optical member that can be made thin and can be easily mass-produced.

In addition, according to the illumination device described in the mode (1), the reflective prism is disposed on the outside of the first refractive prism. Accordingly, it is possible to effectively emit the light incident on the optical member.

Further, in the illumination device described in the mode (1), the reflective prism disposed on the outside of the first refractive prism is configured to cause the light incident thereon to travel to the optical axis side (instead of the side opposite to the optical axis). This is an advantageous configuration for causing the paths after reflection of light incident on the reflective prism to be directed in a direction that has a large angle with respect to the in-plane optical axis, in any of the light distribution planes. The paths refer to paths when being vertically projected on the light distribution plane.

In the illumination device described in the mode (1), preferably, the first refractive prism is disposed in such a way that the first refractive prism is present at both one side and the other side in all of the light distribution planes which are set. The one side and the other side are divided by an intersection point between the in-plane optical axis and the first refractive prism portion.

With this configuration, it is possible to more easily achieve the batwing light distribution having good balance.

In the illumination device described in the mode (1), more preferably, the first refractive prism is disposed in such a way that the first refractive prism is present at both one side and the other side in all of the light distribution planes which are set. Further, the reflective prisms is disposed in such a way that the reflective prism is present at the same side (i.e., respectively, the one side and the other side) as the first refractive prism in all of the light distribution planes which are set. The one side and the other side are divided by an intersection point between the in-plane optical axis and the first refractive prism portion.

In other words, in the illumination device described in the mode (1), it is preferable that the reflective prism is disposed so as to surround the whole (whole length) of a region in which the first refractive prism is disposed.

(2) There is provided an illumination device according to the mode (1) further including: a second refractive prism disposed on an outer side of the reflective prism and having a function of refracting light.

According to the illumination device described in the mode (2), it is possible to effectively achieve the light distribution pattern having a peak in a direction that has a large angle with respect to the optical axis.

In the illumination device described in the mode (2), it is preferable that the second refractive prism is configured to refract the light incident thereon and to cause the incident light to travel to the side opposite to the optical axis.

Further, in the illumination device described in the mode (2), it is preferable that the second refractive prism is disposed so as to surround the whole (whole length) of a region in which the reflective prism is disposed.

With this configuration, it is possible to easily achieve the batwing light distribution that has a large peak angle and good balance.

(3) There is provided an illumination device according to the mode (2), wherein each of the first and second refractive prisms has an inclined surface that is inclined to face the optical axis.

According to the illumination device described in the mode (3), the first and second refractive prisms have inclined surfaces which are inclined so as to face the optical axis. With this configuration, the light which is respectively incident on the first and second refractive prisms can be easily directed to the side opposite to the optical axis.

In the present disclosure, the inclined surfaces are inclined so as to face the optical axis. This means that, in any of the light distribution planes, the cross section (inclined surface in the opposing plane) of the inclined surfaces, which is cut by the light distribution plane, is inclined so as to face the in-plane optical axis.

(4) There is provided an illumination device according to the mode (1), wherein the first refractive prism and the reflective prism are configured to be symmetrical with respect to the optical axis.

According to the illumination device described in the mode (4), it is possible to easily and reliably achieve the batwing light distribution which has good balance and is symmetrical with respect to the optical axis.

For example, the illumination device described in the mode (4) may be configured so that the first refractive prism and the reflective prism are formed in plane symmetry with a predetermined plane (typically, plane orthogonal to the light distribution plane) being a symmetrical plane. The predetermined plane contains the optical axis.

Alternatively, the illumination device described in the mode (4) may be configured so that the first refractive prism and the reflective prism are formed in axial symmetry with the optical axis being a symmetrical axis.

(5) There is provided an illumination device according to the mode (1), wherein the first refractive prism and the reflective prism are provided on an emitting surface side of the optical member.

According to the illumination device described in the mode (5), it is possible to easily achieve a light distribution pattern having a peak in a direction that has a large angle with respect to the optical axis.

(6) There is provided an illumination device according to the mode (5), wherein the first refractive prism and the reflective prism are provided linearly along one direction. The illumination device further includes a linear prism is provided on an incident surface side of the optical member and along a direction orthogonal to the one direction.

According to the illumination device described in the mode (6), the first refractive prism and the reflective prism are linearly provided on the emitting surface side of the optical member and along one direction. In the direction orthogonal to the one direction, the batwing light distribution is achieved by the first refractive prism and the reflective prism. The linear prisms are provided on the incident surface side of the optical member and along the direction orthogonal to the one direction. In the one direction, any desired light distribution pattern can be achieved by the linear prisms.

In the illumination device described in the mode (6), the linear prism is provided on the incident surface side of the optical member and along the direction orthogonal to the one direction. Preferably, the light distribution pattern that is achieved in the one direction by the linear prisms is different from that of the batwing light distribution.

In particular, the illumination device described in the mode (6) may be configured to achieve the batwing light distribution in the direction orthogonal to the one direction and to achieve the asymmetrical light distribution in the one direction. In this case, the illumination device described in this claim is properly used as a street light.

(7) There is provided an illumination device according to the mode (4), wherein the first refractive prism and the reflective prism are concentrically provided about the optical axis.

In the illumination device described in the mode (7), the first refractive prism and the reflective prism are concentrically provided about the optical axis. Therefore, it is possible to achieve the batwing light distribution in the orthogonal direction of the concentric circles.

The illumination device described in the mode (7) can be suitably used as a ceiling light for indoor illumination, for example.

(8) There is provided an illumination device that includes: a light source unit; and an optical member having a plate-like shape and disposed in front of the light source unit. The optical member comprises a first refractive prism having a function of refracting light, and a reflective prism disposed on an outer side of the first refractive prism and having a function of reflecting light. An optical axis of the light source unit is configured to pass through a region in which the first refractive prism is disposed The first refractive prism and the reflective prism are respectively configured so as to cause an incident light to travel to sides opposite to each other with respect to the optical axis.

(9) There is provided an optical member having a plate-like shape and disposed in front of a light source unit, the optical member including: a first refractive prism having a function of refracting light; and a reflective prism disposed on an outer side of the first refractive prism and having a function of reflecting light. The first refractive prism is configured to cause an incident light incident to travel to a side opposite to an optical axis of the light source unit. The reflective prism is configured to cause an incident light to travel to an optical axis side.

Since the illumination device is configured as described above, there is provided an illumination device that is capable of achieving the batwing light distribution by using a plate-like optical member that can be made thin and can be easily mass-produced. In particular, according to the present disclosure, it is possible to provide an illumination device that is suitable for a street light. This illumination device achieves the asymmetric light distribution for one direction and the batwing light distribution for the direction orthogonal to the one direction by using a plate-like optical member that can be made thin and can be easily mass-produced.

Hereinafter, an illustrative embodiment of the present invention will be described with reference to the accompanying drawings. All of each drawing (FIGS. 1A to 6B and 8 to 10) showing a configuration of an illumination device according to the present invention schematically show only a main portion of the illumination device. Accordingly, the illumination device according to each embodiment of the present invention may include other components (not shown) such as a housing for holding the components shown therein. Further, the relative dimensions of each part shown are illustrated to emphasize the characteristics for explanation. The relative dimensions do not necessarily reflect the actual scale.

An illumination device 10 according to a first embodiment of the present invention includes a light source unit 12, an optical member 14, and a housing 5, as shown in FIG. 1A. The light source unit 12 emits light toward the front (upward in FIG. 1A). The optical member 14 is disposed at a predetermined distance in front of the light source unit 12. The housing 5 integrally holds the light source unit 12 and the optical member 14. The optical member 14 is a plate-like member having two main surfaces 14a, 14b. One main surface 14b is arranged so as to face the light source unit 12. That is, in the illumination device 10, the light emitted from the light source unit 12 is incident on the optical member 14 through one main surface 14b of the optical member 14 and emitted from the optical member 14 through the other main surface 14a thereof. Hereinafter, the main surface 14a is referred to as an emitting surface and the main surface 14b is referred to as an incident surface.

In addition, the illumination device 10 may further include components other than the components shown in FIG. 1A. For example, a transparent cover may be disposed in front of the optical member 14.

Herein, for the term "plate-like" described above, it is implied that a thickness is generally thinned in the order of a plate, a sheet (thin plate) and a film, as compared to similar terms such as "sheet-like" and "film-like," for example. However, the term "plate-like" does not have a clear technical meaning associated to the thickness, such as the presence or absence of flexibility, for example. Accordingly, the term "plate-like" is not always used separately from the terms such as "sheet-like" and "film-like." For this reason, also in the present disclosure, in order to concretely indicate the shape having just two main surfaces 14a, 14b, the term "plate-like" is intended to be used as a term that can be replaced as appropriate with the terms such as "thin plate-like," "sheet-like" and "film-like."

In the illumination device 10, the light source unit 12 is configured by a so-called COB (Chip-On-Board) type LED. Further, for the light source unit 12, an axis indicated by a reference numeral "q" in FIG. 1A is a reference axis of the light distribution of the light source unit 12. Typically, the axis q is defined as an imaginary axis that is orthogonal to the light emitting surface 12a of the light source unit 12 and passes through a photometry center (a point assumed as an origin of the light emitted from the light source unit 12). Hereinafter, the axis q is referred to as an optical axis q of the light source unit 12. In the illustrated example, the light emitting surface 12a of the light source unit 12 is consistent with a front surface 12a on an outer shape of the light source unit 12 and the photometry center thereof is located on a geometric center of the light emitting surface 12a.

However, in the illumination device 10, the light emitting surface of the light source unit 12 may have a curved shape or an uncertain shape as a surface on the outer shape of the light source unit 12. In this case, the light emitting surface and the photometry center, which are used in the definition of the optical axis q, are respectively determined as a suitable imaginary plane and position in consideration of the shape of the light source unit 12, etc. In the following description, also in such a case, the light emitting surface of the light source unit 12 is referred to by the reference numeral 12a. In the case where the light source unit 12 has a symmetrical light distribution pattern around an axis orthogonal to the light emitting surface 12a, the optical axis q is normally a symmetry axis of the light distribution pattern and is typically consistent with a geometric central axis of the light emitting surface 12a.

Further, as descried later, in the illumination device 10, the light distribution of the light emitted from the light source unit 12 is controlled to a desired light distribution by the optical member 14. Then, the light where the light distribution is controlled in this way is emitted as illumination light. However, the illumination device 10 is configured so that a reference axis (optical axis of the illumination device 10) of the light distribution of the illumination light is consistent with the optical axis q of the light source unit 12.

Figure 1B:
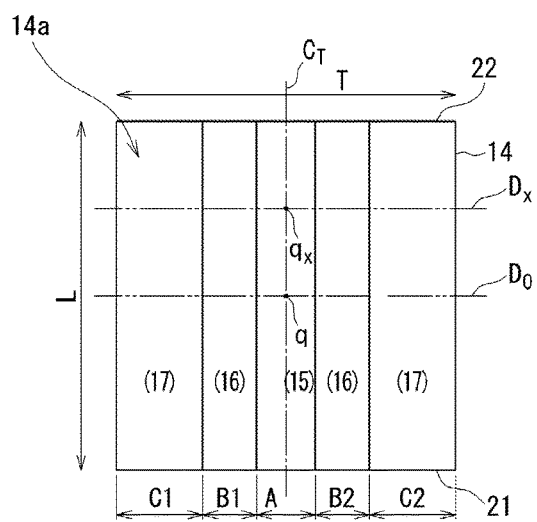

Further, in the illumination device 10, the optical member 14 is molded by a transparent resin material (e.g., acrylic resin) and has a substantially rectangular plate shape (see FIG. 1B), as seen in a plan view. Further, as shown in FIG. 1B, a center line in one direction (a direction of an arrow T shown in FIG. 1B; hereinafter, referred to as a transverse direction) on the emitting surface 14a of the optical member 14 is denoted by $C_T$ and the optical axis q is assumed to pass through the center line $C_T$. In FIG. 1B, an intersection point between the optical axis q and the emitting surface 14a is denoted by the same reference numeral q.

The optical member 14 has a configuration that is intended to control the light distribution pattern mainly in the transverse direction T. Further, for the optical member 14, a series of light distribution planes are set as a series of imaginary planes where the imaginary planes are continuously arranged in parallel to each other from one end 21 to the other end 22 in a longitudinal direction of the optical member 14 along a direction (a direction of an arrow L shown in FIG. 1B; hereinafter, referred to as a longitudinal direction) orthogonal to the transverse direction. The imaginary planes contain the optical axis q and are parallel to the transverse direction T. As an example of such light distribution planes, FIG. 1B shows an intersection line between the emitting surface 14a and a light distribution plane $D_0$ containing the optical axis q (this intersection line is similarly denoted by the reference numeral $D_0$), and an intersection line between the emitting surface 14a and a light distribution plane $D_x$ (this intersection line is similarly denoted by the reference numeral $D_x$). The light distribution plane Dx is arbitrarily selected and does not contain the optical axis q. FIG. 1B also shows an intersection point between the emitting surface 14a and an axis $q_x$ (this intersection point is similarly denoted by the reference numeral $q_x$). The axis $q_x$ is obtained by causing the optical axis q to be vertically projected on the light distribution plane $D_x$. In the present specification, the optical axis q contained in the light distribution plane (e.g., $D_0$) and the axis (e.g., $q_x$) obtained by causing the optical axis q to be vertically projected on the light distribution plane (e.g., $D_x$) are collectively referred to as an in-plane optical axis q'.

In the optical member 14, an "outer side" refers to a side that is distant (has a large distance) from the in-plane optical axis q' along the light distribution planes (e.g., $D_0$ and $D_x$) described above. Accordingly, in the example shown in FIG. 1B, on the right side of the center line $C_T$ in the transverse direction T, the more right side refers to an outer side and the more left side refers to an inner side. Further, on the left side of the center line $C_T$, the more left side refers to an outer side and the more right side refers to an inner side. Further, in the optical member 14, there is no distinction between the inner side and outer side in the longitudinal direction L. The positions in the inner side and outer side on the emitting surface 14a are equivalent along the longitudinal direction L.

Figure 2:
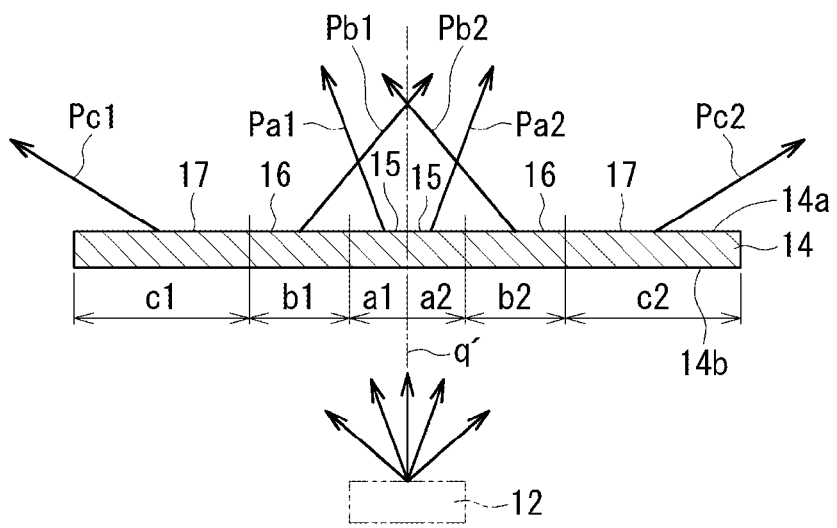
FIG. 2 is a side sectional view showing an aspect of a light distribution control in any of the light distribution planes in the illumination device shown in FIGS. 1A and 1B.

In the illumination device 10, a plurality of prisms 15, 16, 17 is arranged on the emitting surface 14a of the optical member 14 so as to be parallel to each other in the transverse direction T (see FIG. 2). These prisms 15, 16, 17 are linearly extended (in the same cross-sectional shape) from one end 21 to the other end 22 of the optical member 14 along the longitudinal direction L. These linear prisms 15, 16, 17 are configured to have a first refractive prism 15 having a function of refracting light, a reflective prism 16 having a function of reflecting light, and a second refractive prism 17 having a function of refracting light. A plurality of first refractive prisms 15 is arranged in a strip-like region A. The strip-like region A is located at the innermost side on the emitting surface 14a and extends from one end 21 to the other end 22 of the optical member 14 in the longitudinal direction L. A plurality of reflective prisms 16 is arranged in strip-like regions B1, B2. The strip-like regions B1, B2 are located on the outside of the first refractive prisms 15 and extend from one end 21 to the other end 22 of the optical member 14 in the longitudinal direction L. A plurality of second refractive prisms 17 is arranged in strip-like regions C1, C2. The strip-like regions C1, C2 are located on the outside of the reflective prisms 16 and extend from one end 21 to the other end 22 of the optical member 14 in the longitudinal direction L.

The optical axis q passes through the region A (hereinafter, also referred to as a first refractive prism portion) in which the plurality of first refractive prisms 15 is arranged. Accordingly, the first refractive prism portion A contains a region on one side (e.g., left side in FIG. 1B) of the optical axis q and a region on the other side (e.g., right side in FIG. 1B) thereof. In other words, in the optical member 14, the first refractive prisms 15 are present at both one side and the other side (see a1 and a2 in FIG. 2) in all of the light distribution planes which are set. The one side and the other side are divided by an intersection point between the in-plane optical axis q' and the first refractive prism portion A.

Further, in the optical member 14, the regions B1, B2 (hereinafter, also referred to as a reflective prism portion) in which the plurality of reflective prisms 16 is arranged have both the region B1 (hereinafter, also referred to as a left region) and the region B2 (hereinafter, also referred to as a right region). The region B1 is present at the outside (left side) of the first refractive prism portion A on one side (e.g., left side in FIG. 1B) of the center line $C_T$ in the transverse direction T of the emitting surface 14a. The region B2 is present at the outside (right side) of the first refractive prism portion A on the other side (e.g., right side in FIG. 1B) of the center line $C_T$ in the transverse direction T of the emitting surface 14a. Furthermore, both the left region B1 and the right region B2 of the reflective prism portions B1, B2 are strip-like regions that extend (in the illustrated example, in a manner of being in contact with the first refractive prism portion A, respectively) from one end 21 to the other end 22 in the longitudinal direction L of the optical member 14, similarly to the first refractive prism portion A. This arrangement means that the plurality of reflective prisms 16 is arranged so as to surround the whole (whole length in the longitudinal direction L) of the first refractive prism portion A, for the optical member 14 where there is no distinction between the inner side and outer side in the longitudinal direction L.

In other words, in the optical member 14, the first refractive prisms 15 are present at both one side and the other side in all of the light distribution planes which are set. The one side and the other side are divided by an intersection point between the in-plane optical axis q' and the first refractive prism portion A. In addition to this, the reflective prisms 16 are respectively present on the same side (see b1 and b2 in FIG. 2) as the one side and the other side where the first refractive prisms 15 are present. The reflective prisms 16 are disposed on the outside of the first refractive prisms 15.

Furthermore, in the optical member 14, the regions C1, C2 (hereinafter, also referred to as a second refractive prism portion) in which the plurality of second refractive prisms 17 is arranged have both the region C1 (hereinafter, also referred to as a left region) and the region C2 (hereinafter, also referred to as a right region). The region C1 is present at the outside (left side) of the left region B1 of the reflective prism portions B1, B2 on one side (e.g., left side in FIG. 1B) of the center line $C_T$ in the transverse direction T of the emitting surface 14a. The region C2 is present at the outside (right side) of the right region B2 of the reflective prism portions B1, B2 on the other side (e.g., right side in FIG. 1B) of the center line $C_T$ in the transverse direction T of the emitting surface 14a. Furthermore, both the left region C1 and the right region C2 of the second refractive prism portions C1, C2 are strip-like regions that extend (in the illustrated example, in a manner of being in contact with the left region B1 and the right region B2 of the reflective prism portions B1, B2, respectively) from one end 21 to the other end 22 in the longitudinal direction L of the optical member 14, similarly to the reflective prism portions B1, B2. This arrangement means that the plurality of second refractive prisms 17 is arranged so as to surround the whole (whole length in the longitudinal direction L) of the reflective prism portions B1, B2, for the optical member 14 where there is no distinction between the inner side and outer side in the longitudinal direction L.

In other words, in the optical member 14, the first refractive prisms 15 are present at both one side and the other side in all of the light distribution planes which are set. The one side and the other side are divided by an intersection point between the in-plane optical axis q' and the first refractive prism portion A. Further, the reflective prisms 16 are respectively present on the same side as the one side and the other side where the first refractive prisms 15 are present. The reflective prisms 16 are disposed on the outside of the first refractive prisms 15. In addition to this, the second refractive prisms 17 are respectively present on the same side (see c1 and c2 in FIG. 2) as the one side and the other side where the first refractive prisms 15 are present. The second refractive prisms 17 are disposed on the outside of the reflective prisms 16.

Additionally, in the optical member 14, the first refractive prisms 15, the reflective prisms 16 and the second refractive prisms 17 are configured in plane symmetry (mirror symmetry) with a plane (containing the optical axis q and the center line $C_T$) being a symmetric plane. Namely, the first refractive prism portion A, the reflective prism portions B1, B2 and the second refractive prism portions C1, C2 are configured so as to have the plane symmetry as described above, including the shape and arrangement of the plurality of first refractive prisms 15, the plurality of reflective prisms 16 and the plurality of second refractive prisms 17, which are disposed in each of the portions. However, the present invention is not limited thereto. For example, the number of the prisms may be different from each other at the left and right regions of the center line $C_T$ as a reference.

The optical characteristics of the first refractive prisms 15, the reflective prisms 16 and the second refractive prisms 17 in the illumination device 10 will be described with reference to FIG. 2. The optical characteristics are as follows. FIG. 2 is a side sectional view of the optical member 14, taken along a specific light distribution plane (e.g., light distribution plane $D_x$). FIG. 2 shows paths of light emitted from the emitting surface 14a, together with paths Pa1, Pa2, Pb1, Pb2, Pc1, Pc2 which are obtained by causing the paths to be vertically projected on the light distribution plane. In addition, the optical characteristics of the first refractive prisms 15, the reflective prisms 16 and the second refractive prisms 17 in the illumination device 10 are the same in the longitudinal direction L of the emitting surface 14a, from the geometric configurations thereof. Therefore, the characteristics that are described below with reference to FIG. 2 are common for all of the light distribution planes.

The light distribution plane corresponding to FIG. 2 is a light distribution plane that contain respective incident positions to the first refractive prisms 15 (in the case of the paths Pa1, Pa2), the reflective prisms 16 (in the case of the paths Pb1, Pb2) and the second refractive prisms 17 (in the case of the paths Pc1, Pc2), which correspond to the paths Pa1, Pa2, Pb1, Pb2, Pc1, Pc2. The paths Pa1, Pa2, Pb1, Pb2, Pc1, Pc2 shown are paths which are obtained by causing actual paths of light (emitted from the first refractive prisms 15, the reflective prisms 16 and the second refractive prisms 17, which correspond to respective incident positions) to be vertically projected on the light distribution plane.

However, in the case where the incident positions of the light to the first refractive prisms 15, the reflective prisms 16 and the second refractive prisms 17 and the emitting positions of each incident light when being emitted from the optical member are substantially different from each other in a plan view, the light distribution plane may be a light distribution plane containing the emitting positions from the emitting surface 14a, as described above.

In the illumination device 10, the first refractive prisms 15 are configured so as to cause the light incident thereon to mainly travel to the side opposite to the optical axis q. Further, in the illumination device 10, the first refractive prisms 15 are provided on the emitting surface 14a of the optical member 14. Therefore, in the case where the first refractive prisms 15 are configured so as to cause the light incident thereon to travel to the side opposite to the optical axis q, this means that the light emitted from the emitting surface 14a of the optical member 14 through the first refractive prisms 15 travels to the side opposite to the optical axis q. Accordingly, in the illumination device 10, the first refractive prisms 15 are configured so that the paths Pa1, Pa2 vertically projected on the light distribution plane containing the incident positions to the first refractive prisms 15 are displaced away (i.e., toward the outside) from the in-plane optical axis q' without intersecting with the in-plane optical axis q', for the light emitted from the emitting surface 14a of the optical member 14 through the first refractive prisms 15.

The reflective prisms 16 are configured so as to cause the light incident thereon to mainly travel to the optical axis q side. Further, in the illumination device 10, the reflective prisms 16 are provided on the emitting surface 14a of the optical member 14. Therefore, in the case where the reflective prisms 16 are configured so as to cause the light incident thereon to travel to the optical axis q side, this means that the light emitted from the emitting surface 14a of the optical member 14 through the reflective prisms 16 travels to the optical axis q side. Namely, in the illumination device 10, the reflective prisms 16 are configured so that the paths Pb1, Pb2 vertically projected on the light distribution plane containing the incident positions to the reflective prisms 16 once approach the in-plane optical axis q' (and then intersect with the in-plane optical axis q' and then are displaced away therefrom), for the light emitted from the emitting surface 14a of the optical member 14 through the reflective prisms 16.

Further, similarly to the first refractive prisms 15, the second refractive prisms 17 are configured so as to cause the light incident thereon to mainly travel to the side opposite to the optical axis q. With this configuration, the second refractive prisms 17 are configured so that the paths Pc1, Pc2 vertically projected on the light distribution plane containing the incident positions to the second refractive prisms 17 are displaced away (i.e., toward the outside) from the in-plane optical axis q' without intersecting with the in-plane optical axis q', for the light emitted from the emitting surface 14a of the optical member 14 through the second refractive prisms 17. This configuration is similar to the first refractive prisms 15.

Figure 3:
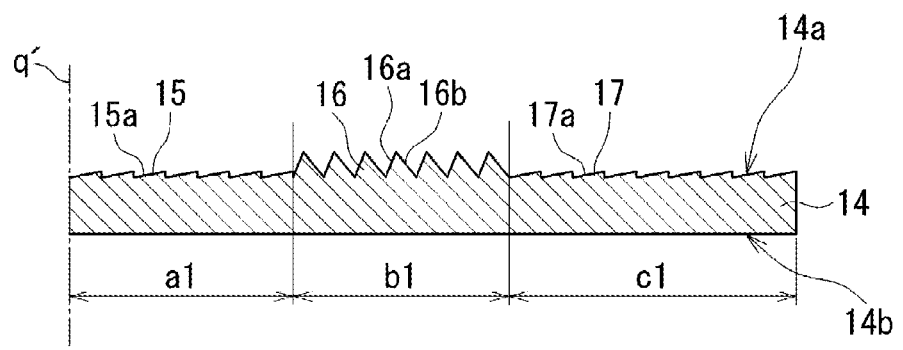
FIG. 3 is a partial side sectional view showing a configuration of a first refractive prism, a reflective prism and a second refractive prism in the illumination device shown in FIGS. 1A and 1B.

The specific configurations of the first refractive prisms 15, the reflective prisms 16 and the second refractive prisms 17 will be described with reference to FIG. 3. The specific configurations are as follows. FIG. 3 is a side sectional view of the optical member 14 corresponding to FIG. 2. FIG. 3 schematically shows the specific configurations of the first refractive prisms 15, the reflective prisms 16 and the second refractive prisms 17. In addition, FIG. 3 is a view partially showing only a right portion of the in-plane optical axis q' in the side cross-section of the optical member 14. However, as described above, the first refractive prisms 15, the reflective prisms 16 and the second refractive prisms 17 are configured in the plane symmetry (mirror symmetry) with a plane (containing the optical axis q and the center line CT) being a symmetric plane. Therefore, the right portion of the in-plane optical axis q' in the side cross-section of the optical member 14 has a line symmetrical shape with the in-plane optical axis q' being a symmetric axis.

In the illumination device 10, each of the first and second refractive prisms 15, 17 has inclined surfaces (refractive surfaces) 15a, 17a which are inclined so as to face the optical axis q. The first and second refractive prisms 15, 17 are configured so that at least a portion of the light incident thereon is refracted by the inclined surfaces 15a, 17a and then emitted. That is, the first and second refractive prisms 15, 17 have a function of refracting light. With this configuration, the first and second refractive prisms 15, 17 become concave refractive prisms and serve as a linear Fresnel lens that is equivalent to a concave cylindrical lens. In the case where the inclined surfaces 15a, 17a are inclined so as to face the optical axis q, this means that, in all of the light distribution planes, the cross section (the inclined surfaces 15a, 17a in the light distribution plane) of the inclined surfaces 15a, 17a cut by the light distribution plane is inclined so as to face the in-plane optical axis q', as shown in FIG. 3.

Further, in the illumination device 10, the reflective prisms 16 are so-called total reflection (TIR; Total Internal Reflection) type prisms. Specifically, each of the reflective prisms 16 has a pair of prism surfaces 16a, 16b including a first surface 16a and a second surface 16b. The first surface 16a faces the optical axis q and the second surface 16b faces the side opposite to the optical axis q. The reflective prisms 16 are configured so that at least a portion of the light incident thereon is totally reflected by the second surface 16b and thus emitted from the first surface 16a. That is, the reflective prisms 16 have a function of refracting light. In the case where the first surface 16a faces the optical axis q and the second surface 16b faces the side opposite to the optical axis q, this refers to the same meaning as the inclined surfaces 15a, 17a described above.

By being configured as described above, the illumination device 10 achieves the following operational advantages.

First, in the illumination device 10, the first refractive prisms 15 (a1) and the second refractive prisms 17 (c1) are provided on one side (e.g., left side in FIG. 2). The reflective prisms 16 (b2) are provided on the other side (e.g., right side in FIG. 2). The one side and the other side are divided by an intersection point between the in-plane optical axis q' and the first refractive prism portion A. In all of the light distribution planes, the paths Pa1, Pc1, Pb2 (which are vertically projected in the light distribution plane) of the light emitted from the first refractive prisms 15 (a1), the light emitted from the second refractive prisms 17 (c1) and the light emitted from the reflective prisms 16 (b2) are directed in a direction inclined to the one side (left side in FIG. 2) of the in-plane optical axis q'. Hereinafter, the light emitted from the first refractive prisms 15 (a1), the light emitted from the second refractive prisms 17 (c1), and the light emitted from the reflective prisms 16 (b2) are also referred to as a first emitted light.

On the other hand, the first refractive prisms 15 (a2) and the second refractive prisms 17 (c2) are provided on the other side. The reflective prisms 16 (b1) are provided on the one side (e.g., left side in FIG. 2). The one side and the other side are divided by the intersection point between the in-plane optical axis q' and the first refractive prism portion A. In all of the light distribution planes, the paths Pa2, Pc2, Pb1 (which are vertically projected in the light distribution plane) of the light emitted from the first refractive prisms 15 (a2), the light emitted from the second refractive prisms 17 (c2) and the light emitted from the reflective prisms 16 (b1) are directed in a direction inclined to the other side (right side in FIG. 2) of the in-plane optical axis q'. Hereinafter, the light emitted from the first refractive prisms 15 (a2), the light emitted from the second refractive prisms 17 (c2), and the light emitted from the reflective prisms 16 (b1) are also referred to as a second emitted light.

Specifically, in the illumination device 10, in all of the light distribution planes, the first emitted light and the second emitted light are emitted in angular directions in which the paths (which are vertically projected on the light distribution plane) spread to opposite sides (i.e., to the outside, respectively) of the optical axis q.

In the illumination device 10, it is possible to achieve a bimodal batwing light distribution that has a peak in two angular directions opposite to each other with respect to the optical axis, in a series of light distribution planes which are set. Furthermore, it is possible to uniformly illuminate a relatively long region along the transverse direction T of the optical member 14.

The illumination device 10 is advantageous in that the batwing light distribution described above can be achieved by using the plate-like optical member 14 that can be made thin and can be easily mass-produced.

In addition, in the illumination device 10, the reflective prisms 16 are arranged so as to surround the whole of the first refractive prism portion A. The second refractive prisms 17 are arranged so as to surround the whole of the reflective prism portions B1, B2. The first refractive prisms 15, the reflective prisms 16 and the second refractive prisms 17 are configured in plane symmetry with a plane (containing the optical axis q and the center line $C_T$) being a symmetrical plane. Accordingly, it is possible to achieve the batwing light distribution having good balance (e.g., having a symmetrical light distribution pattern with a plane (containing the optical axis q and the center line $C_T$) being a symmetrical plane).

Further, in the illumination device 10, the first and the second refractive prisms 15, 17 are configured as a concave refractive prism. This is an advantageous configuration for emitting the light emitted from the optical member 14 in the direction of spreading the light outwardly with respect to the optical axis q. Further, as in the illumination device 10, the first refractive prisms 15, the reflective prisms 16 and the second refractive prisms 17 are provided on the emitting surface 14a of the optical member 14. This configuration is advantageous for increasing the spread angle to the optical axis q in the traveling direction of the emitted light, as compared to the configuration that these prisms 15, 16, 17 are provided on the incident surface 14b.

Additionally, in the illumination device 10, the operational advantages of the configuration that the reflective prisms 16 are disposed on the outside of the first refractive prisms 15 will be described with reference to FIGS. 4A and 4B. The operational advantages are as follows.

Figure 4A:
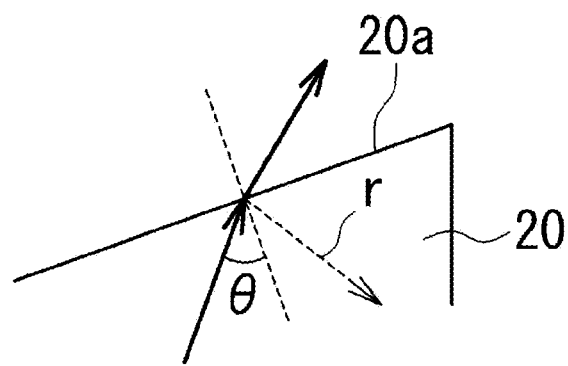
FIG. 4A and FIG. 4B are views for explaining the relationship between the arrangement of the first refractive prism and the reflective prism and operational advantages thereof in the illumination device shown in FIGS. 1A and 1B.
Figure 4B:
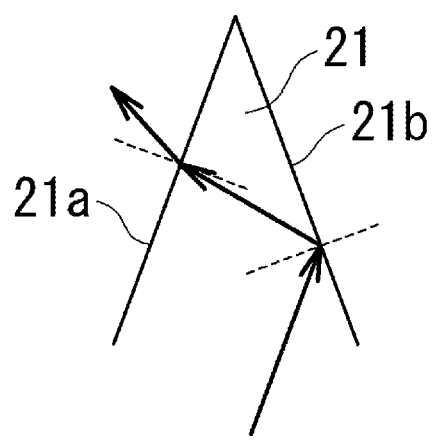

Generally, a refractive prism 20 as shown in FIG. 4A has a small incident angle θ in the vicinity of the optical axis q. Therefore, a reflected light r in a refractive plane 20a is small, so that the emitted light can be more effectively emitted, as compared to a reflective prism 21 as shown in FIG. 4B. However, in the position that is distant from the optical axis q, the incident angle θ is large and the reflected light r in the refractive plane 20a is increased. Accordingly, the emitting efficiency of the reflective prism 21 is improved, as compared to the refractive prism 20.

Therefore, in the illumination device 10, the first refractive prisms 15 are disposed on an inner side (i.e., in the vicinity of the optical axis q) of the emitting surface 14a of the optical member 14 and the reflective prisms 16 are disposed on an outer side thereof. In this way, it is possible to more effectively emit the light emitted from the emitting surface 14a of the optical member 14.

In the illumination device 10, the operational advantages of the configuration that the reflective prisms 16 are configured to cause the light incident thereon to travel to the optical axis q side will be described with reference to FIGS. 5A to 5C. The operational advantages are as follows.

Figure 5A:
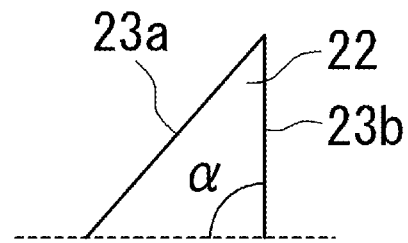
FIG. 5A, FIG. 5B and FIG. 5C are views for explaining the relationship between the configuration of the reflective prism and operational advantages thereof in the illumination device shown in FIGS. 1A and 1B.
Figure 5B:
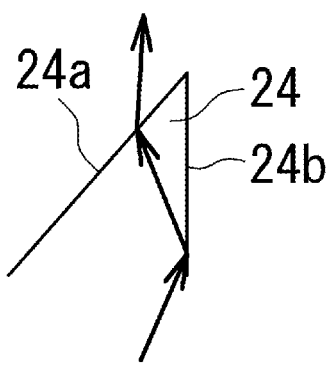
Figure 5C:
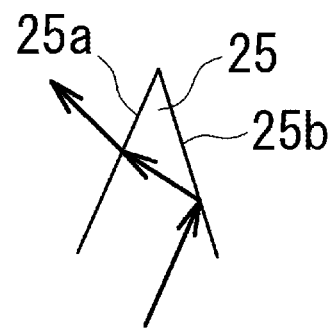

Generally, in a reflective prism 22 as shown in FIG. 5A, it is preferable that an inclined angle of a first face 23a and a second face 23b (to an imaginary plane parallel to a main surface) is set to 90° or less in order to improve the releasing property from a mold. In particular, the inclined angle α of the second face 23b that is a reflective surface is set to 90° or less. Accordingly, in the configuration that, as in a reflective prism 24 shown in FIG. 5B, the light emitted from the reflective prism 24 is inclined in the same direction as the incident light corresponding thereto, there is a limitation on increasing an angle of the emitted light by increasing an inclined angle of a second face 24b. On the other hand, it is easy to configure a reflective prism 25 in such a way that the emitted light is emitted in a state of having a large angle in a direction opposite to the incident light, as shown in FIG. 5C.

Accordingly, in the illumination device 10, the reflective prisms 16 are configured to cause the incident light to travel to the optical axis q side. With this configuration, in any of the light distribution planes, a path (i.e., a path of light emitted from the reflective prisms 16) after reflection of light incident on the reflective prisms 16 can be directed in a direction that has a large angle with respect to the in-plane optical axis q'.

In the illumination device 10, the operational advantages of the configuration that the second refractive prisms 17 are disposed on the outside of the reflective prisms 16 will be described with reference to FIGS. 6A and 6B. The operational advantages are as follows.

Figure 6A:
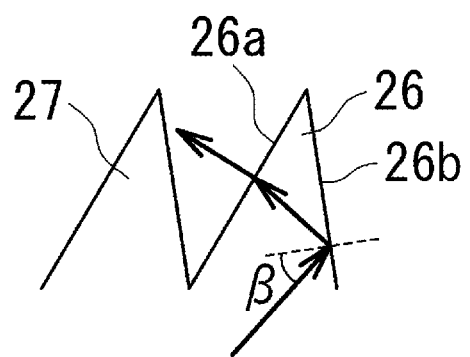
FIG. 6A and FIG. 6B are views for explaining the relationship between the arrangement of the reflective prism and the second refractive prism and operational advantages thereof in the illumination device shown in FIGS. 1A and 1B.
Figure 6B:
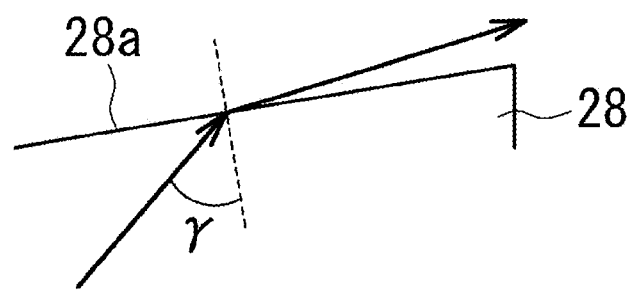

Generally, in the case where a reflective prism 26 as shown in FIG. 6A is disposed at a position that is distant from the optical axis q, it is preferable to increase the inclined angle (see an angle α in FIG. 5A) in order to set an incident angle β of the incident light to a second face 26b to a critical angle or more. The second face 26b serves as a reflective surface. Therefore, in the reflective prism 26 disposed at a position that is distant from the optical axis q, out of the light emitted in a direction that has a large angle with respect to the optical axis q, the amount of light whose path is blocked by a reflective prism 27 adjacent thereto is increased. As shown in FIG. 6B, a refractive prism 28 may be configured in such a way that an inclined angle γ of the incident light to a refractive surface (inclined surface) 28a is set to a critical angle or less. In this case, the reflected light in the refractive surface 28a is increased but the emitted light can be emitted in a direction that has a large angle with respect to the optical axis q.

Accordingly, in the illumination device 10, the second refractive prisms 17 are disposed on the outside of the reflective prisms 16. With this configuration, in any of the light distribution planes, a path (i.e., a path of light emitted from the second refractive prisms 17) after reflection of the light incident on the optical member 14 in a position that is distant (toward the outside) from the optical axis q can be directed in a direction that has a large angle with respect to the in-plane optical axis q'. Furthermore, it is possible to effectively achieve a light distribution pattern where a peak is present in a direction that has a large angle with respect to the optical axis q.

Figure 7:
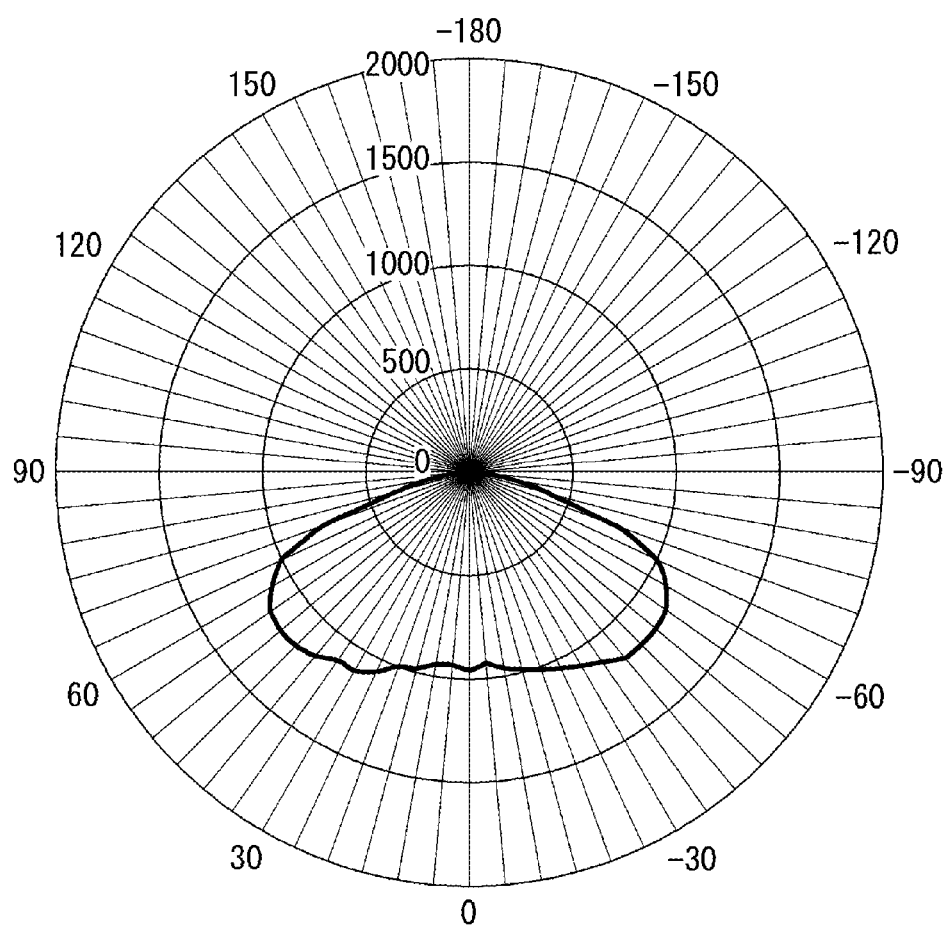
FIG. 7 is a graph showing the light distribution characteristic in one light distribution plane in the illumination device shown in FIGS. 1A and 1B.

FIG. 7 is a graph showing the results of the numerical analysis that verifies the light distribution pattern of the illumination device 10. The optical member 14 used in the numerical analysis has a thickness of 1.5 mm and a planar shape thereof is a square shape of 100 mm×100 mm. Further, an area ratio of the first refractive prism portion A, the reflective prism portions B1, B2, and the second refractive prism portions C1, C2 is set to 1:3:6. All pitches of each of the first refractive prisms 15, the reflective prisms 16 and the second refractive prisms 17 are set to 50 μm.

The graph shown in FIG. 7 is a graph showing a light distribution pattern in a light distribution plane containing the optical axis q of the illumination device 10. In FIG. 7, 0° direction refers to the direction of the optical axis q. From FIG. 7, it can be seen that, in the illumination device 10, a batwing light distribution is achieved. The batwing light distribution has a peak at around ±50° and is symmetrical with respect to the optical axis q.

Although not shown, in the numerical analysis, a unimodal light distribution pattern that is symmetrical with respect to the optical axis q is achieved, for the direction (the longitudinal direction L of the optical member 14) orthogonal to the light distribution plane shown in FIG. 7.

Figure 8:
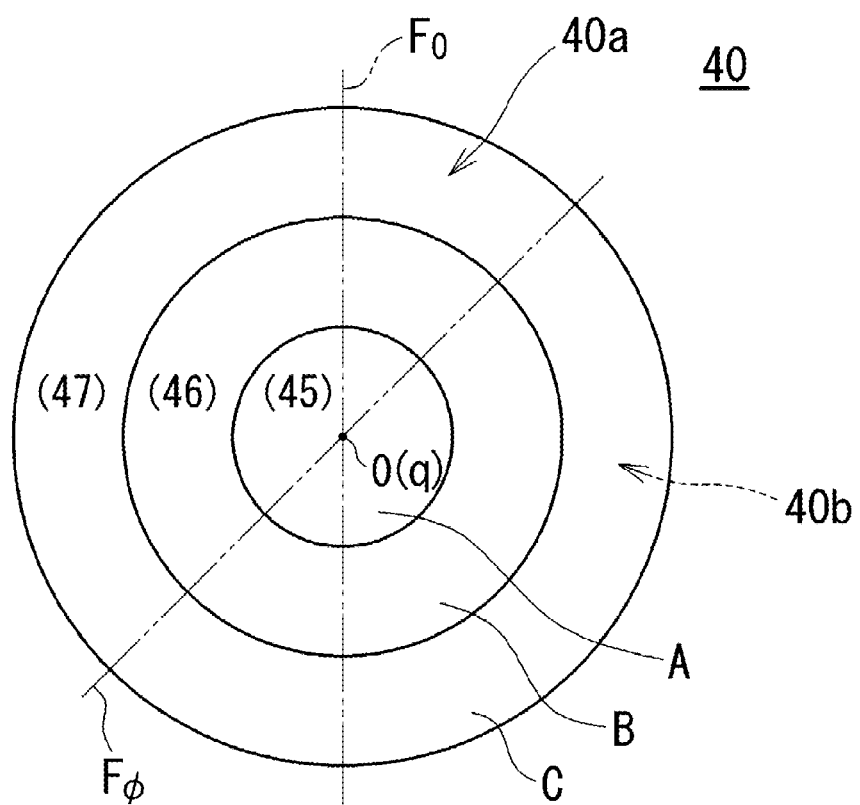
FIG. 8 is a plan view showing a configuration of an optical member in another example of the illumination device according to the first embodiment of the present invention.

Another example of the optical member in the illumination device of the present embodiment is shown in FIG. 8. An optical member 40 shown in FIG. 8 is formed in a circle shape, as seen in a plan view. An optical axis q of the optical member 40 passes through the center O of the circle. Further, on an emitting surface 40a of the optical member 40, a plurality of first refractive prisms 45, a plurality of reflective prisms 46 and a plurality of second refractive prisms 47 are provided concentrically around the center O.

In this case, a series of light distribution planes which are properly set are continuously connected and made by the rotation of an imaginary plane containing the optical axis q over one lap with the optical axis q being a rotation axis. In this way, the optical axis q is contained in all of the light distribution planes (i.e., in all of the light distribution planes, the in-plane optical axis q' is the optical axis q itself). As an example of such light distribution planes, FIG. 8 shows an intersection line between the emitting surface 40a and a light distribution plane $F_0$ (this intersection line is similarly denoted by the reference numeral $F_0$), and an intersection line between the emitting surface 40a and a light distribution plane $F_\phi$ (this intersection line is similarly denoted by the reference numeral $F_\phi$). The light distribution plane $F_\phi$ has a direction different from the light distribution plane F0 and is arbitrarily selected.

In the optical member 40, an "outer side" refers to the side that is distant (has a large distance) from the in-plane optical axis q' along the light distribution plane (e.g., $F_0$, $F_\phi$). In all of the light distribution planes, the "outer side" refers to the side that is distant from the center O in the radial direction and an "inner side" refers to the side that is closer to the center O in the radial direction.

Accordingly, also in the optical member 40 shown in FIG. 8, the reflective prisms 46 disposed in an annular region B are arranged on the outside of the first refractive prisms 45 so as to surround the whole (whole outer periphery) of the first refractive prism portion A. The second refractive prisms 47 disposed in an annular region C are arranged on the outside of the reflective prisms 46 so as to surround the whole (whole outer periphery) of the reflective prism portion B. Further, in the optical member 40, the first refractive prisms 45, the reflective prisms 46 and the second refractive prisms 47 are formed in the axial symmetry with the optical axis q being a symmetrical axis.

The configurations and operational advantages of the first refractive prisms 45, the reflective prisms 46 and the second refractive prisms 47 of the optical member 40 shown in FIG. 8 are in common with the first refractive prisms 15, the reflective prisms 16 and the second refractive prisms 17, which are described with reference to FIG. 2 to FIG. 6B. However, the optical member 40 can achieve the batwing light distribution in the series of light distribution planes (e.g., $F_0$, $F_\phi$) that contain the optical axis q and are set as described above. Therefore, the illumination device (similarly, denoted by the reference numeral 10) including the optical member 40 is properly used as an illumination device for uniformly illuminating a plane (e.g., normal interior floor) that has relatively uniform spread for all directions.

In the illumination device 10 of the present embodiment, a light scattering element may be provided on the incident surfaces 14b, 40b of the optical members 14, 40.

Further, in the illumination device 10 of the present embodiment, one (e.g., the first refractive prisms 15, 47) or both of the first refractive prisms 15, 45 and the second refractive prisms 17, 47 may be provided on the incident surfaces 14b, 40b of the optical members 14, 40.

One or both of the first refractive prisms 15, 45 and the second refractive prisms 17, 47 may be configured by the prisms that are provided on both of the emitting surfaces 14a, 40a and the incident surfaces 14b, 40b of the optical members 14, 40 so as to be overlapped, as seen in a plan view. In this case, for example, convex refractive prisms may be provided on the emitting surfaces 14a, 40a and concave refractive prisms may be provided on the incident surfaces 14b, 40b.

Further, in the illumination device 10 of the present embodiment, the second refractive prisms 17, 47 are not essential components. The optical members 14, 40 may not include the second refractive prisms 17, 47 when there is no need to significantly increase the peak angle of the light distribution pattern.

Next, an illumination device according to a second embodiment of the present invention will be described with reference to FIG. 9A to FIG. 11. However, the illumination device according to the second embodiment of the present invention is different from the illumination device 10 shown in FIGS. 1A and 1B only in the configuration of the incident surface of the optical member. Accordingly, for the same configurations as in the illumination device 10 shown in FIGS. 1A and 1B, a description is omitted as appropriate. The difference is mainly described in the following section.

An optical member 50 is provided in the illumination device according to the present embodiment. An outer shape of the optical member 50 and a configuration of an emitting surface 50a thereof are the same as the optical member 14, including the configurations of the first refractive prisms 15, the reflective prisms 16 and the second refractive prisms 17, which are provided on the emitting surface 50a. Thereby, for the light distribution plane in common with a series of light distribution planes which are set for the optical member 14, the same light distribution pattern is achieved.

In addition, a plurality of prisms 51, 52 is provided on an incident surface 50b of the optical member 50. The prisms 51, 52 are extended in a direction (i.e., the transverse direction T of the optical member 50) that is orthogonal to an extension direction of the plurality of prisms 15, 16, 17 provided on the emitting surface 50a. The prisms 51, 52 are arranged parallel to each other in the longitudinal direction L.

Figure 9A:
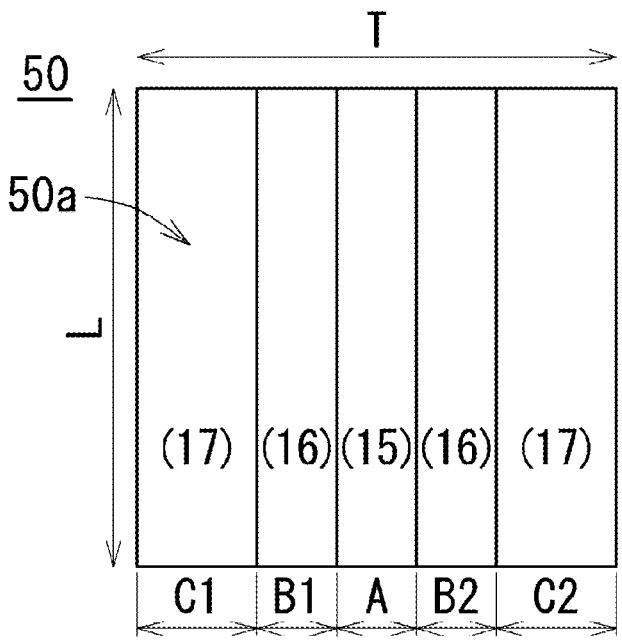
Figure 9B:
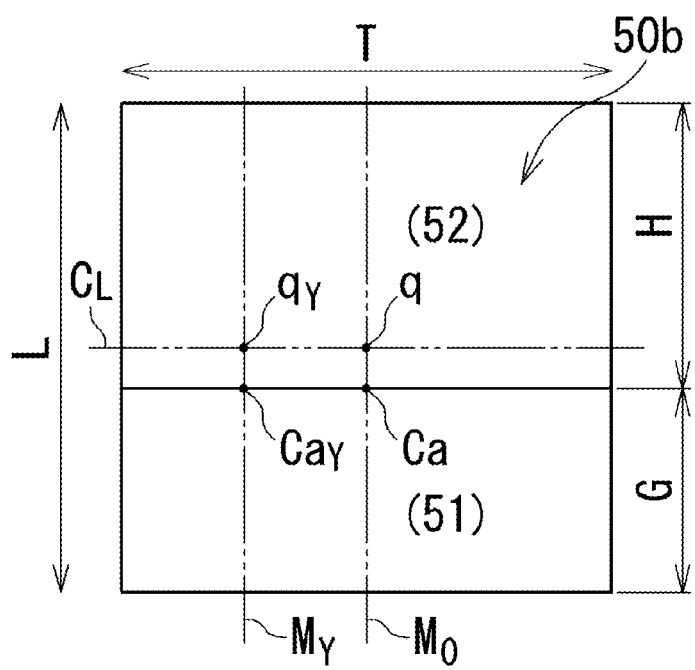

The plurality of prisms 51, 52 is provided with the intention of enabling the optical member 50 to control the light distribution pattern mainly in the longitudinal direction L. Accordingly, a series of light distribution planes which are suited for the configuration of the incident surface 50b of the optical member 50 are set as a series of imaginary planes where the imaginary planes are continuously arranged in parallel to each other along the transverse direction T. The imaginary planes contain the optical axis q and are parallel to the longitudinal direction L. In FIG. 9B, an intersection line between the incident surface 50b and a light distribution plane $M_0$ containing the optical axis q (this intersection line is similarly denoted by the reference numeral $M_0$) and an intersection line between the incident surface 50b and a light distribution plane $M_Y$ (this intersection line is similarly denoted by the reference numeral $M_Y$) are shown as an example of such light distribution plane. The light distribution plane $M_Y$ is arbitrarily selected and does not contain the optical axis q. Further, in FIG. 9B, an intersection point between the incident surface 50a and an axis $q_Y$ are shown. The intersection point is similarly denoted by the reference numeral $q_Y$. The axis $q_Y$ is obtained by causing the optical axis q to be vertically projected on the light distribution plane $M_Y$. The optical axis q and the axis $q_Y$ are collectively referred to as the in-plane optical axis q'. This is the same as the case of a series of light distribution planes which are set for the configuration of the emitting surface 50a.

Hereinafter, a series of light distribution planes which are set for the light distribution control in the emitting surface 50a of the optical member 50 are referred to as a first series of light distribution planes. Further, a series of light distribution planes which are set for the light distribution control in the incident surface 50b of the optical member 50 are referred to as a second series of light distribution planes.

Furthermore, the optical member 50 includes a reference axis Ca that is an imaginary axis. The reference axis Ca serves as a reference (or as a reference for arranging the plurality of prisms 51, 52) of the light distribution control operation, for the light distribution control by the plurality of prisms 51, 52 on the incident surface 50b. The plurality of prisms 51, 52 is arranged based on the reference axis Ca in the following manner.

Specifically, in the optical member 50, the plurality of prisms 51, 52 are provided in regions G, H on both sides which are divided by an imaginary plane (hereinafter, also referred to as a reference plane). The imaginary plane includes the reference axis Ca and is parallel to the transverse direction T. The reflective prisms 51 are arranged in a first region G (lower region in FIG. 9B) of the regions G, H. The refractive prisms 52 are arranged in a second region H (upper region in FIG. 9B) of the regions G, H.

Additionally, in FIG. 9B, an intersection point between the emitting surface 50a and an axis $Ca_Y$ is shown. The intersection point is similarly denoted by the reference numeral $Ca_Y$. The axis $Ca_Y$ is obtained by causing the reference axis Ca to be vertically projected on the light distribution plane $M_Y$. Hereinafter, the reference axis Ca and the axis $Ca_Y$ are collectively referred to as an in-plane reference axis Ca'.

The reflective prisms 51 are total reflection type prisms which are similar to the reflective prisms 16, 46. Further, the refractive prisms 52 are concave refractive prisms which are similar to the first and second refractive prisms 15, 45 and 17, 47. However, in the refractive prisms 52, inclined surfaces (equivalent to the inclined surfaces 15a, 17a in FIG. 3) having a refracting function are inclined so as to face the reference axis Ca.

Further, in the optical axis 50, the reference axis Ca that divides the incident surface 50b into the first region G and the second region H is set to be shifted in the longitudinal direction L so that the optical axis q passes through the inside of the second region H where the refractive prisms 52 are disposed.

The operational advantages of the reflective prisms 51 and the refractive prisms 52, which are configured as described above, will be described with reference to FIG. 9A to FIG. 10. The operational advantages are as follows.

Figure 10:
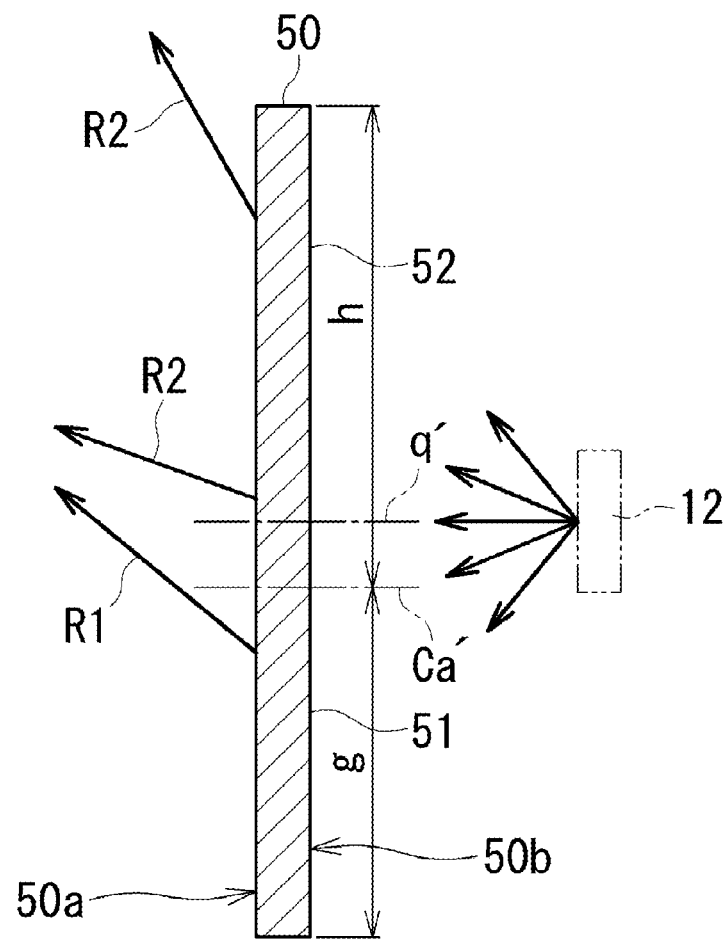
FIG. 10 is a side sectional view showing an aspect of the light distribution control in any of the light distribution planes in the illumination device shown in FIGS. 9A and 9B.

FIG. 10 is a side sectional view of the optical member 50 cut by a specific light distribution plane (e.g., light distribution plane $M_Y$) of the second series of light distribution planes. FIG. 10 shows paths of light emitted from the emitting surface 50a, together with paths R1, R2, R3 that are obtained by causing the paths to be vertically projected on the light distribution plane.

In the optical member 50, the optical characteristics of the reflective prisms 51 and the refractive prisms 52 are the same in the transverse direction T of the incident surface 50b, from the geometric configurations thereof. Therefore, the characteristics that are described below with reference to FIG. 10 are common for all of the second series of light distribution planes.

First, most of light that is emitted from the light source unit 12 and reaches the second region H of the incident surface 50b is incident on the optical member 50 through an inclined surface of the refractive prisms 52 having a refractive function. Further, the inclined surfaces of the refractive prisms 52 are formed so as to face the reference axis Ca. Therefore, by properly setting the inclined angle of the inclined surfaces, the incident light is emitted from the emitting surface 50a in a state where the paths vertically projected on the light distribution plane corresponding to FIG. 10 are inclined in a direction from the first region G side (g shown in FIG. 10) toward the second region H side (h shown in FIG. 10) with respect to the in-plane optical axis q' (see the path R2 shown in FIG. 10).

In the illumination device of the present embodiment, a plurality of reflective prisms 51 is provided in the first region G of the incident surface 50b of the optical member 50. Therefore, light is emitted from the light source unit 12 in a state of being largely inclined in a direction from the second region H side (h shown in FIG. 10) toward the first region G side (g shown in FIG. 10) with respect to the in-plane optical axis q'. Then, the light reaches the incident surface 50b in the first region G. Then, the light is incident on the optical member 50 through the reflective prisms 51 and emitted from the emitting surface 50a in a state where the paths vertically projected on the light distribution plane corresponding to FIG. 10 are inclined in a direction from the first region G side toward the second region H side with respect to the in-plane optical axis q' (see the path R1 shown in FIG. 10).

In this way, according to the illumination device including the optical member 50, in all of the second series of light distribution planes, the amount of light that is emitted in a state of being inclined in a direction from the first region G side toward the second region H side of the optical member 50 with respect to the in-plane optical axis q' can be relatively increased, as compared to the amount of light that is emitted in other directions. Furthermore, it is possible to achieve an asymmetrical light distribution pattern that has a peak in one direction having an angle with respect to the in-plane optical axis q'.

Figure 11:
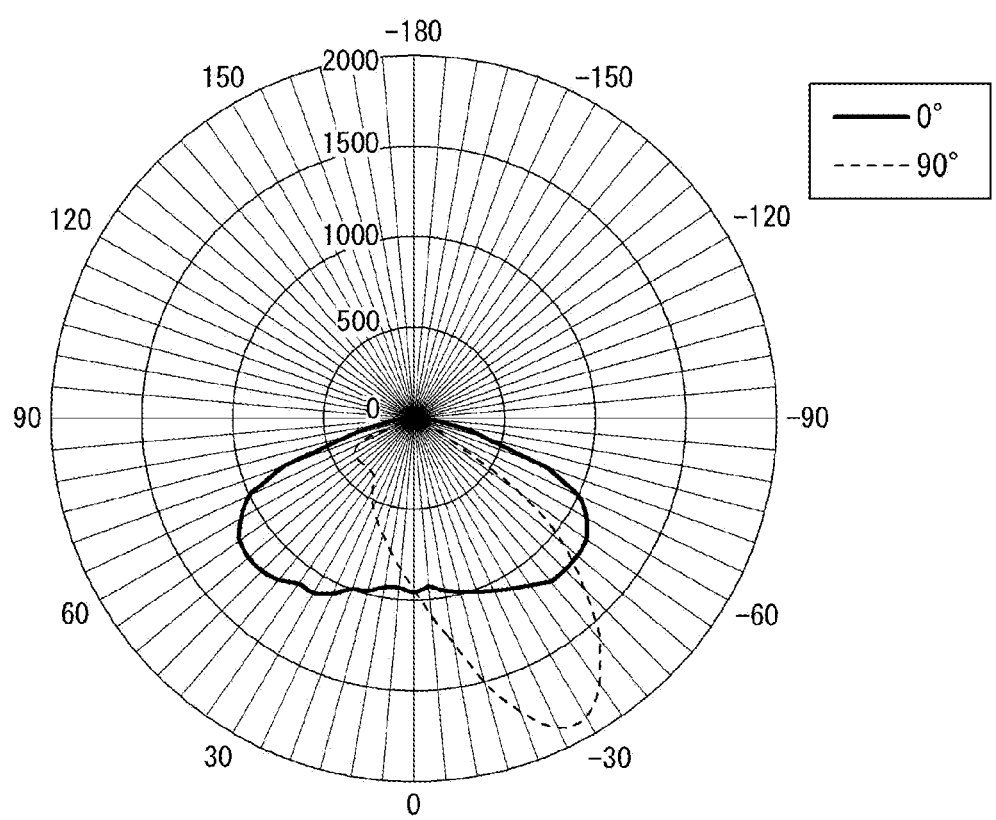
FIG. 11 is a graph showing a light distribution characteristic in one light distribution plane and a light distribution characteristic in a light distribution plane orthogonal to one light distribution plane in the illumination device shown in FIGS. 9A and 9B.

FIG. 11 is a graph showing the results of the numerical analysis that verifies the light distribution pattern of the illumination device including the optical member 50. The optical member 50 used in the numerical analysis is the same as the optical member 14 used in the numerical analysis whose results are shown in FIG. 7, except that the reflective prisms 51 and the refractive prisms 52 are provided in the incident surface 50b. In addition, all prism pitches of each of the reflective prisms 51 and the refractive prisms 52 are set to 50 μm, similarly to the first refractive prisms 15, the reflective prisms 16 and the second refractive prisms 17.

The graph shown in FIG. 11 is a graph showing the light distribution pattern (in other words, the light distribution pattern in the transverse direction T of the optical member 50) in the first series of light distribution planes containing the optical axis q and the light distribution pattern (in other words, the light distribution pattern in the longitudinal direction L of the optical member 50) in the second series of light distribution planes containing the optical axis q. The light distribution in the first series of light distribution planes is indicated by a solid line (0°) and the light distribution in the second series of light distribution planes is indicated by a broken line (90°). Further, 0° direction shown in FIG. 11 refers to the direction of the optical axis q. From FIG. 11, it can be seen that, in the illumination device, the batwing light distribution is achieved in the transverse direction T and the asymmetrical light distribution is achieved in the longitudinal direction L orthogonal to the transverse direction T. The batwing light distribution has a peak at around ±50° and is symmetrical with respect to the optical axis q. The asymmetrical light distribution pattern has a peak at a range of −25° to −30°.

The investigation carried out by the present inventors have shown that light distribution characteristics in good agreement with the numerical analysis can be confirmed in a prototype.

By having such light distribution characteristics, the illumination device of the present embodiment can be properly used as an illumination device that has properties suitable for the street light. Specifically, when being used as a street light (road light) that is erected on the side of a road, etc., the illumination device uniformly illuminates a relatively long range by the batwing light distribution in a road traffic direction, and, on the other hand, the illumination device mainly illuminates the road side by the asymmetric light distribution in a road width direction orthogonal to the road traffic direction.

In the illumination device according to the present embodiment, a light distribution pattern is obtained by the plurality of prisms provided on the incident surface 50b of the optical member 50. This light distribution pattern is not limited to the asymmetric light distribution pattern as described above. For example, the plurality of prisms provided on the incident surface 50b of the optical member 50 and extending in the transverse direction T can be configured so as to narrow the width of the light distribution in the longitudinal direction L. By doing so, it is possible to achieve a linear illuminance light that has excellent uniformity in the transverse direction T and extends in the transverse direction T.

Further, in the first and second embodiments, a plurality of light source units 12 may be discretely arranged at intervals and multiple sets of prisms (the first refractive prisms 15, the reflective prisms 16, and, as necessary, the second refractive prisms 17) for the batwing light distribution may be provided in the optical member 50 so as to correspond to each of the light source units 12. In this way, the illumination device may be formed in an elongated shape.

What is claimed is:

1. An illumination device comprising:
a light source unit; and
an optical member having a plate-like shape and disposed in front of the light source unit,
wherein the optical member comprises a first refractive prism having a function of refracting light, and a reflective prism disposed on an outer side of the first refractive prism and having a function of reflecting light,
wherein an optical axis of the light source unit is configured to pass through a region in which the first refractive prism is disposed,
wherein the first refractive prism is configured to cause an incident light to travel to a side opposite to the optical axis,
wherein the reflective prism is configured to cause an incident light to travel to the optical axis side,
wherein the first refractive prism and the reflective prism are provided linearly along a first direction on a first surface of the optical member,
wherein the optical member further comprises a linear prism along a second direction orthogonal to the first direction on a second surface of the optical member, and
wherein the linear prism is configured to be asymmetric with respect to the optical axis.

2. The illumination device according to claim 1 further comprising:
a second refractive prism disposed on an outer side of the reflective prism and having a function of refracting light.

3. The illumination device according to claim 2,
wherein each of the first and second refractive prisms has an inclined surface that is inclined to face the optical axis.

4. The illumination device according to claim 1,
wherein the first refractive prism and the reflective prism are configured to be symmetrical with respect to the optical axis.

5. The illumination device according to claim 1,
wherein the first refractive prism and the reflective prism are provided on an emitting surface side of the optical member.

6. The illumination device according to claim 4,
wherein the first refractive prism and the reflective prism are concentrically provided about the optical axis.

7. An illumination device comprising:
a light source unit; and
an optical member having a plate-like shape and disposed in front of the light source unit,
wherein the optical member comprises a first refractive prism having a function of refracting light, and a reflective prism disposed on an outer side of the first refractive prism and having a function of reflecting light,
wherein an optical axis of the light source unit is configured to pass through a region in which the first refractive prism is disposed,
wherein the first refractive prism and the reflective prism are respectively configured so as to cause an incident light to travel to sides opposite to each other with respect to the optical axis,
wherein the first refractive prism and the reflective prism are provided linearly along a first direction on a first surface of the optical member,
wherein the optical member further comprises a linear prism along a second direction orthogonal to the first direction on a second surface of the optical member, and
wherein the linear prism is configured to be asymmetric with respect to the optical axis.

8. The illumination device according to claim 7 further comprising:
a second refractive prism disposed on an outer side of the reflective prism and having a function of refracting light.

9. The illumination device according to claim 8,
wherein each of the first and second refractive prisms has an inclined surface that is inclined to face the optical axis.

10. The illumination device according to claim 7,
wherein the first refractive prism and the reflective prism are configured to be symmetrical with respect to the optical axis.

11. The illumination device according to claim 7,
wherein the first refractive prism and the reflective prism are provided on an emitting surface side of the optical member.

12. An optical member having a plate-like shape and disposed in front of a light source unit, the optical member comprising:
a first refractive prism having a function of refracting light; and
a reflective prism disposed on an outer side of the first refractive prism and having a function of reflecting light,
wherein the first refractive prism is configured to cause an incident light incident to travel to a side opposite to an optical axis of the light source unit, wherein the reflective prism is configured to cause an incident light to travel to an optical axis side, wherein the first refractive prism and the reflective prism are provided linearly along a first direction on a first surface of the optical member, wherein the optical member further comprises a linear prism along a second direction orthogonal to the first direction on a second surface of the optical member, and wherein the linear prism is configured to be asymmetric with respect to the optical axis.

13. The optical member according to claim 12 further comprising:

a second refractive prism disposed on an outer side of the reflective prism and having a function of refracting light.

14. The optical member according to claim 13, wherein each of the first and second refractive prisms has an inclined surface that is inclined to face the optical axis.

15. The optical member according to claim 12, wherein the first refractive prism and the reflective prism are configured to be symmetrical with respect to the optical axis.

16. The optical member according to claim 12, wherein the first refractive prism and the reflective prism are provided on an emitting surface side of the optical member.

17. The illumination device according to claim 1, wherein the optical member has a first area and a second area that are divided by an imaginary reference plane that is in parallel with the liner prism and includes a reference axis of a light distribution control, and wherein the linear prism includes a liner reflective prism disposed in the first area and a liner refractive prism disposed in the second area.

18. The illumination device according to claim 17, wherein the liner refractive prism has an inclined surface that is inclined to face the reference axis.

19. The illumination device according to claim 17, wherein the optical axis passes through the second area.

* * * * *